US009135582B2

(12) United States Patent
Tadano

(10) Patent No.: US 9,135,582 B2

(45) Date of Patent: Sep. 15, 2015

(54) POWER DEMAND FORECAST DEVICE, METHOD AND SYSTEM AND POWER FAILURE DETECTION SYSTEM

(71) Applicant: SONY CORPORATION, Tokyo (JP)

(72) Inventor: Taro Tadano, Chiba (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 13/655,188

(22) Filed: Oct. 18, 2012

(65) Prior Publication Data

US 2013/0103217 A1 Apr. 25, 2013

(30) Foreign Application Priority Data

Oct. 24, 2011 (JP) ................................ 2011-233272

(51) Int. Cl.

*G05B 13/02* (2006.01)
*G06Q 10/04* (2012.01)
*G06Q 50/06* (2012.01)

(52) U.S. Cl.

CPC ................ *G06Q 10/04* (2013.01); *G06Q 50/06* (2013.01)

(58) Field of Classification Search

CPC .... G06Q 50/06; G06Q 10/04; H02J 2003/003
USPC ............................ 700/22, 286, 291, 295, 297
See application file for complete search history.

(56) References Cited

U.S. PATENT DOCUMENTS 7,712,100 B2 * 5/2010 Fellenstein et al. ........... 718/104
7,991,513 B2 * 8/2011 Pitt .............................. 700/295
8,473,111 B1 * 6/2013 Shankar et al. ............... 700/293
2003/0055677 A1 * 3/2003 Brown et al. ..................... 705/1
2005/0102068 A1 * 5/2005 Pimputkar et al. ............ 700/291
2010/0292856 A1 * 11/2010 Fujita ........................... 700/291
2011/0231028 A1 * 9/2011 Ozog ........................... 700/291
2012/0053739 A1 * 3/2012 Brian et al. ................... 700/287
2012/0221163 A1 * 8/2012 Forbes, Jr. ..................... 700/295
2012/0303300 A1 * 11/2012 McDonald et al. ............. 702/62
2013/0120151 A1 * 5/2013 San Andres et al. .......... 340/635
2013/0245841 A1 * 9/2013 Ahn et al. ...................... 700/286
2014/0148963 A1 * 5/2014 Ozog ........................... 700/291

FOREIGN PATENT DOCUMENTS

JP 05-018995 1/1993
JP 11-031521 A 2/1999
JP 11-225438 A 8/1999
JP 2003-097846 A 4/2003
JP 2003-209994 A 7/2003
JP 2004-312798 A 11/2004
JP 2005-130581 A 5/2005
JP 2007-156696 A 6/2007
JP 2007-299200 A 11/2007
JP 2009-077498 A 4/2009
JP 2011-210097 A 10/2011
JP 2011-232903 A 11/2011

* cited by examiner

*Primary Examiner* — Ramesh Patel

(74) *Attorney, Agent, or Firm* — Wolf, Greenfield & Sacks, P.C.

(57) ABSTRACT

Disclosed herein is a power demand forecast device including: an absence detection section adapted to detect whether a consumer is absent at a given location; and a power demand forecast section adapted to forecast a power demand on a forecasted date and time in future based on an absence detection result obtained by the absence detection section.

17 Claims, 9 Drawing Sheets

100
160
POWER DEMAND FORECAST SECTION
161 DEMAND FORECAST CONTROL PORTION
162 NORMAL TIME DEMAND FORECAST PORTION
163 ABSENCE TIME DEMAND FORECAST PORTION
150 FORECAST DATABASE
NORMAL TIME DEMAND DATABASE 151
ABSENCE TIME DEMAND DATABASE 152
PRESENCE/ABSENCE DATABASE 153
120 PRESENCE/ABSENCE INFORMATION GENERATION SECTION
110 PRESENCE/ABSENCE DETECTION SECTION
130 POWER MEASUREMENT SECTION
ENVIRONMENTAL INFORMATION INPUT SECTION
140

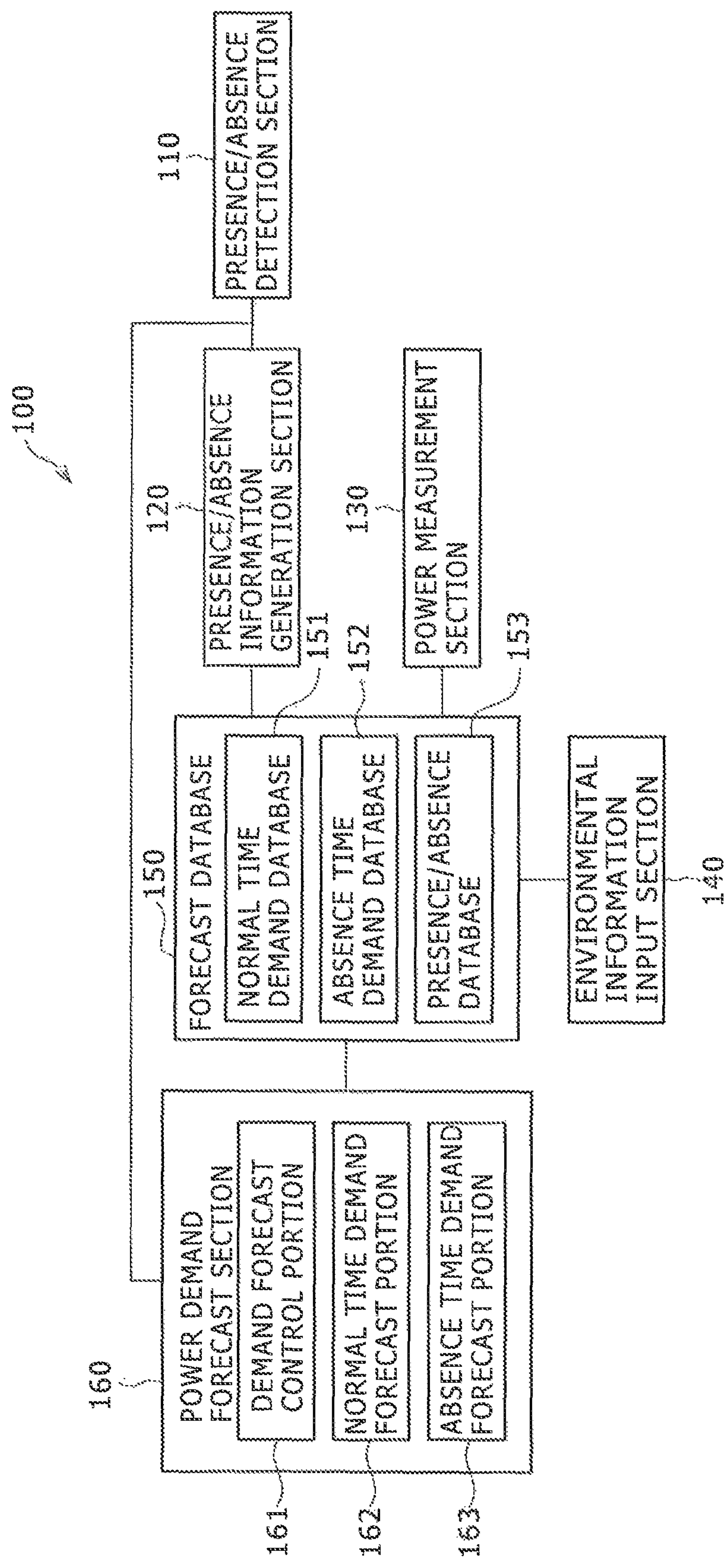
FIG. 1
100
110
PRESENCE/ABSENCE DETECTION SECTION
120
PRESENCE/ABSENCE INFORMATION GENERATION SECTION
130
POWER MEASUREMENT SECTION
150
FORECAST DATABASE
151
NORMAL TIME DEMAND DATABASE
152
ABSENCE TIME DEMAND DATABASE
153
PRESENCE/ABSENCE DATABASE
140
ENVIRONMENTAL INFORMATION INPUT SECTION
160
POWER DEMAND FORECAST SECTION
161
DEMAND FORECAST CONTROL PORTION
162
NORMAL TIME DEMAND FORECAST PORTION
163
ABSENCE TIME DEMAND FORECAST PORTION

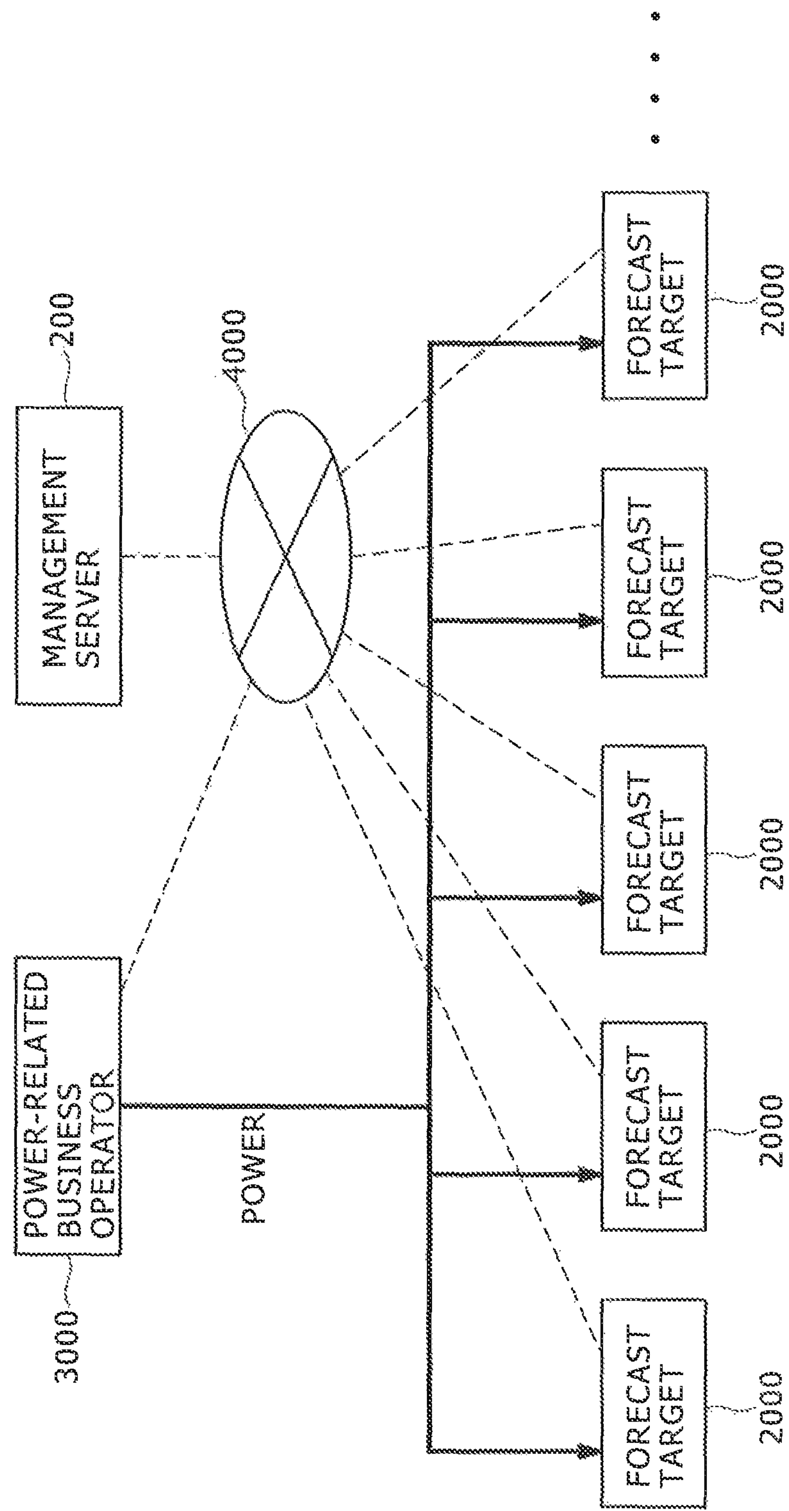
F I G . 2
MANAGEMENT SERVER
200
4000
POWER-RELATED BUSINESS OPERATOR
3000
POWER
FORECAST TARGET
2000
FORECAST TARGET
2000
FORECAST TARGET
2000
FORECAST TARGET
2000
FORECAST TARGET
2000

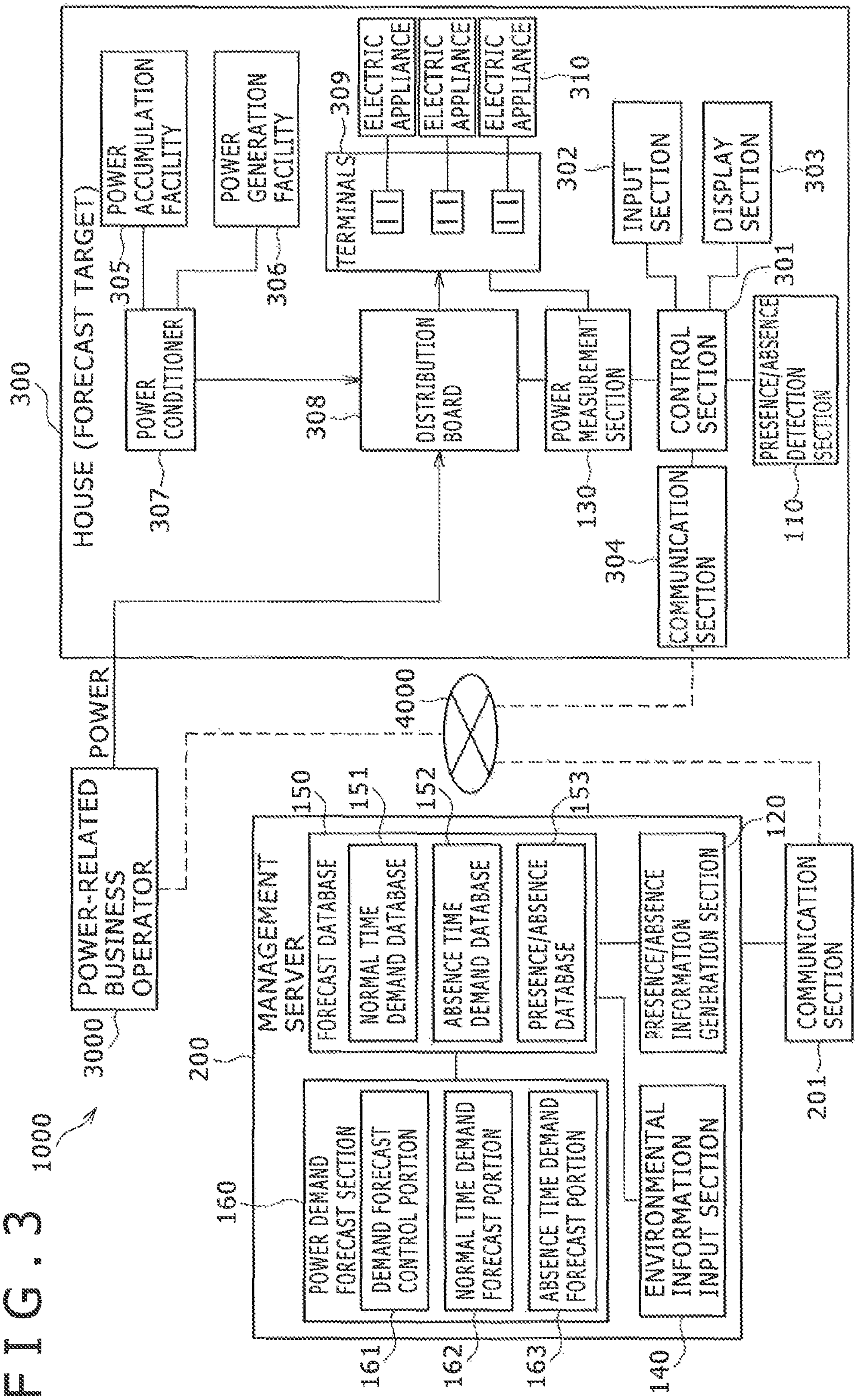
F I G . 3
1000
3000
POWER-RELATED BUSINESS OPERATOR
POWER
4000
300
HOUSE (FORECAST TARGET)
POWER ACCUMULATION FACILITY
305
POWER GENERATION FACILITY
306
POWER CONDITIONER
307
DISTRIBUTION BOARD
308
TERMINALS
309
ELECTRIC APPLIANCE
ELECTRIC APPLIANCE
ELECTRIC APPLIANCE
310
POWER MEASUREMENT SECTION
130
CONTROL SECTION
301
INPUT SECTION
302
DISPLAY SECTION
303
COMMUNICATION SECTION
304
PRESENCE/ABSENCE DETECTION SECTION
110
200
MANAGEMENT SERVER
FORECAST DATABASE
150
NORMAL TIME DEMAND DATABASE
151
ABSENCE TIME DEMAND DATABASE
152
PRESENCE/ABSENCE DATABASE
153
PRESENCE/ABSENCE INFORMATION GENERATION SECTION
120
COMMUNICATION SECTION
201
POWER DEMAND FORECAST SECTION
160
DEMAND FORECAST CONTROL PORTION
161
NORMAL TIME DEMAND FORECAST PORTION
162
ABSENCE TIME DEMAND FORECAST PORTION
163
ENVIRONMENTAL INFORMATION INPUT SECTION
140

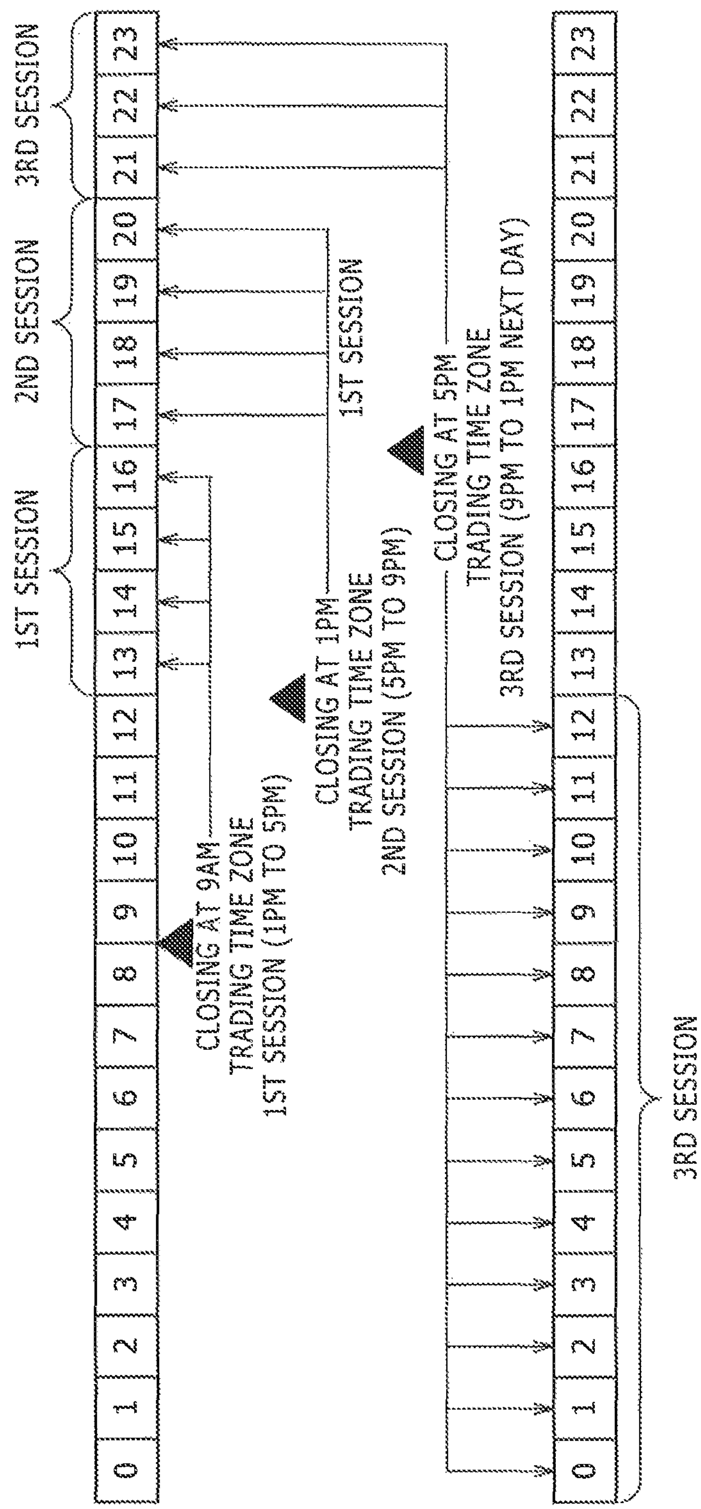
F I G . 4
1ST SESSION
2ND SESSION
3RD SESSION
0 1 2 3 4 5 6 7 8 9 10 11 12 13 14 15 16 17 18 19 20 21 22 23
CLOSING AT 9AM
TRADING TIME ZONE
1ST SESSION (1PM TO 5PM)
CLOSING AT 1PM
TRADING TIME ZONE
2ND SESSION (5PM TO 9PM)
1ST SESSION
CLOSING AT 5PM
TRADING TIME ZONE
3RD SESSION (9PM TO 1PM NEXT DAY)
0 1 2 3 4 5 6 7 8 9 10 11 12 13 14 15 16 17 18 19 20 21 22 23
3RD SESSION

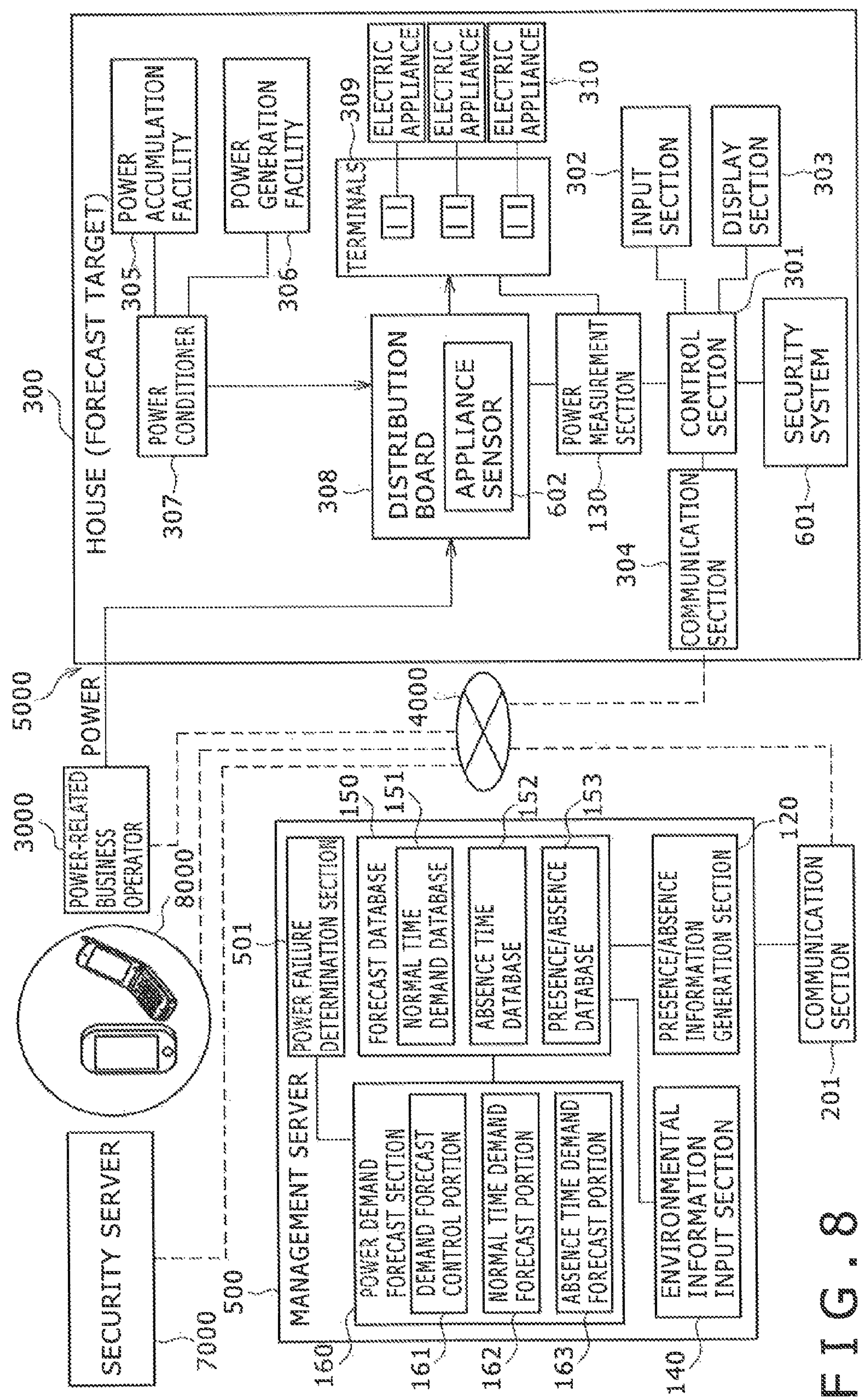
F I G . 8

POWER DEMAND FORECAST DEVICE, METHOD AND SYSTEM AND POWER FAILURE DETECTION SYSTEM

BACKGROUND

The present technology relates to a power demand forecast device, method and system and power failure detection system.

In a number of nations, supply of power to power consumers has been left exclusively in the hands of electric utilities. In recent years, however, entry of entities other than electric utilities into power retailing business and power futures trading have been realized or promoted in a bid to introduce competition into the electric power industry and supply power at lower prices.

Power futures trading refers, for example, to forecasting the necessary amount of electric power in advance and selling or buying electric power up to the following day or 24 hours later through the electricity market. In order for an entity engaged in power retailing and power futures trading as its line of business to hold superiority in trading and make large profits, it is necessary for that entity to make an accurate forecast of power demand.

As a technique used to forecast power demand, a total power demand forecast device has been proposed that forecasts total power demand by accepting meteorological variables including past temperatures and humidities and total power demand data and further learning in neural networks (see Japanese Patent Laid-Open No. Hei 5-18995, hereinafter referred to as Patent Document 1).

SUMMARY

The total power demand forecast device described in Patent Document 1 is designed to forecast power demand based on past meteorological data and total power demand data. Power demand is highly correlated with meteorological data such as average temperatures and humidities. Therefore, it is possible to forecast power demand to a certain extent by utilizing meteorological data.

However, power demand is also closely correlated with factors other than meteorological data. In order to make a more accurate forecast, therefore, it is necessary to consider other factors. Power demand in ordinary households lacks, regularity, thus making it difficult to make an accurate forecast. Power demand in ordinary households varies significantly depending on whether consumers are absent or not.

In light of the foregoing, it is desirable to provide a power demand forecast device, method and system that can forecast power demand with high accuracy and a power failure detection system.

According to a first technology, there is provided a power demand forecast device that includes an absence detection section and power demand forecast section. The absence detection section detects whether a consumer is absent at a given location. The power demand forecast section forecasts a power demand on a forecasted date and time in future based on an absence detection result obtained by the absence detection section.

Further, according to a second technology, there is provided a power demand forecast method that detects whether a consumer is absent at a given location and forecasts a power demand based on an absence detection result.

Still further, according to a third technology, there is provided a power demand forecast system that includes an absence detection section, power demand forecast server and communication section. The absence detection section detects whether a consumer is absent at a given location. The power demand forecast server includes a power demand forecast section adapted to forecast a power demand based on an absence detection result obtained by the absence detection section. The communication section transmits the absence detection result obtained by the absence detection section to the power demand forecast server.

Still further, according to a fourth technology, there is provided a power failure detection system that includes an absence detection section, power failure determination section and communication section. The absence detection section detects whether a consumer is absent at a given location. The power failure determination section determines whether a power failure is taking place if the absence of the consumer is detected by the absence detection section. The communication section notifies the occurrence of a power failure to external equipment if the power failure determination section determines that a power failure is taking place.

The present technology allows to forecast a power demand of a consumer with high accuracy.

BRIEF DESCRIPTION OF THE DRAWINGS

FIG. 1 is a block diagram illustrating the configuration of a power demand forecast device;

FIG. 2 is a block diagram illustrating the schematic configuration of a HEMS (home energy management system);

FIG. 3 is a block diagram illustrating the configuration of the HEMS having a power controller;

FIG. 4 is a diagram for describing the scheme for hour-ahead trading of power;

FIG. 8 is a block diagram illustrating the schematic configuration of the HEMS according to a second embodiment of the present technology.

DETAILED DESCRIPTION OF THE PREFERRED EMBODIMENTS

Figure 5:
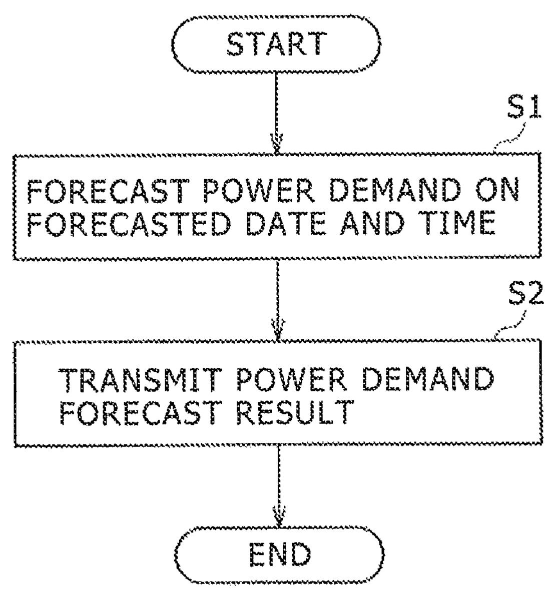
FIG. 5 is a flowchart illustrating the flow of a power demand forecast process.
Figure 6:
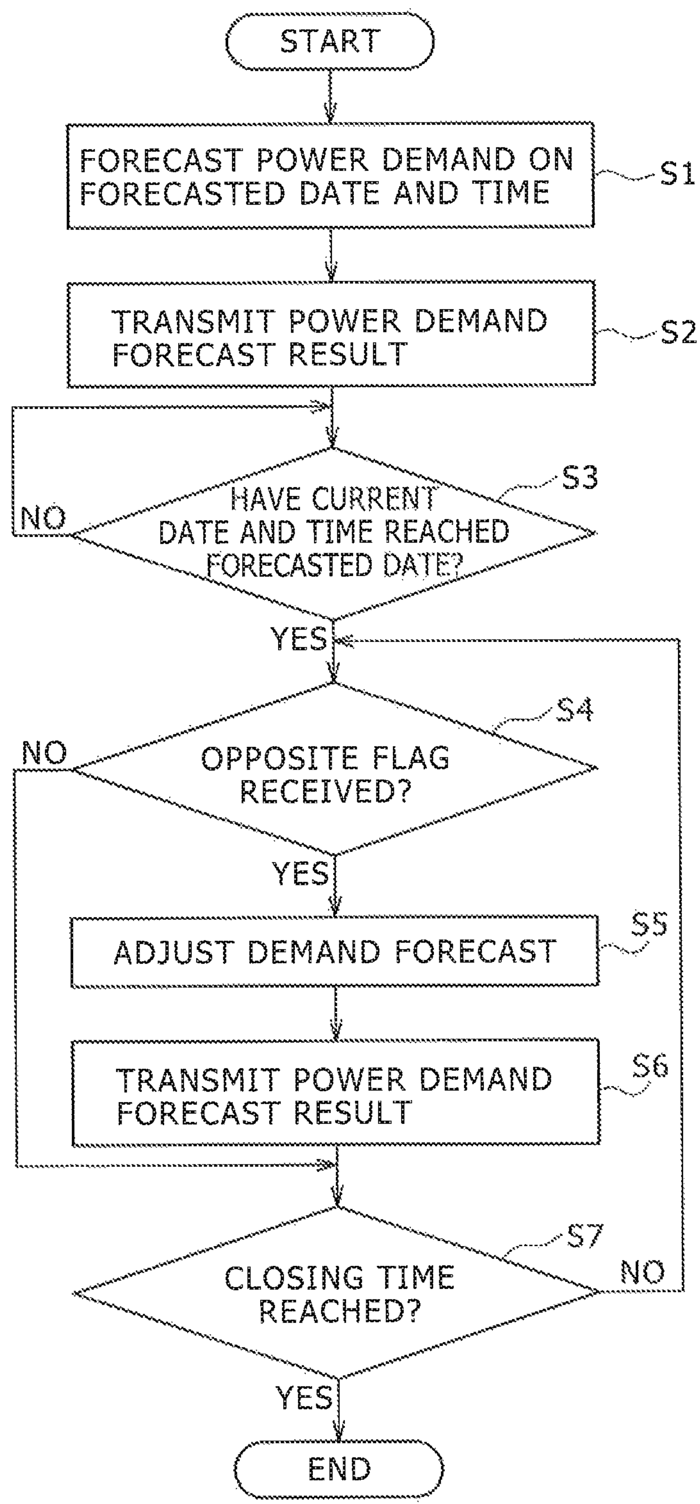
FIG. 6 is a flowchart illustrating the flow of the power demand forecast process.

A description will be given below of the preferred embodiments of the present technology with reference to the accompanying drawings. However, the present technology is not limited in application to the embodiments described below. It should be noted that the description will be given in the following order.

<1. First Embodiment>
[1-1. Configuration of the Power Demand. Forecast Device]
[1-2. Configuration of the HEMS Having the Power Demand Forecast Device]
[1-3. Outline of Power Trading]
[1-4. Power Demand. Forecast Process]
<2. Second Embodiment>
[2-1. Configuration of the HEMS Having Power Failure Determination Function]
[2-2. Power Failure Determination Process]
<3. Modification Example>

1. First Embodiment

[1-1. Configuration of the Power Demand Forecast Device]

FIG. 1 is a block diagram illustrating the configuration of a power demand forecast device 100. The power demand forecast device 100 includes a presence/absence detection section 110, presence/absence information generation section 120, power measurement section 130, environmental information input section 140, forecast database 150 and power demand forecast section 160. The forecast database 150 includes a normal time demand database 151, absence time demand database 152 and presence/absence database 153. On the other hand, the power demand forecast section 160 includes a demand forecast control portion 161, normal time demand forecast portion 162 and absence time demand forecast portion 163.

The presence/absence detection section 110 detects whether there is a consumer in a structure such as a house, condominium, building, commercial facility or a floor of a building or commercial facility whose power demand is to be forecasted by the power demand forecast device 100. That is, the presence/absence detection section 110 detects the presence or absence of a consumer. The term "given location" in the appended claims refers to a space, zone or area where a consumer uses electric power including a house, condominium, building, commercial facility and the like. It should be noted that a description will be given assuming that the power demand of a house is forecasted. The term "consumer" refers to the resident of the house whose power demand is to be forecasted. The presence/absence detection section 110 may be of any kind so long as it can detect the presence or absence of the consumer. A possible example is input means such as button or switch that accepts an input from the consumer may be used. Other possible examples are an infrared sensor, infrared camera, and camera and system adapted to detect a human from an image captured by the camera.

The presence/absence detection section 110 transmits an absence flag to the presence/absence information generation section 120 if it detects the absence of the consumer. On the other hand, the presence/absence detection section 110 transmits a presence flag to the presence/absence information generation section 120 when it detects the consumer is not absent, that is, the presence of the consumer in the structure. Further, an absence flag and presence flag are also transmitted to the power demand forecast section 160. Although described in detail later, absence and presence flags directly transmitted from the presence/absence detection section 110 to the power demand forecast section 160 each serve as a trigger for the power demand forecast adjustment process which will be described later.

It should be noted that if the plurality of presence/absence detection sections 110 are provided, identification information such as an ID indicating the sender of a presence or absence flag (e.g., information indicating from which presence/absence detection section 110 the flag was transmitted if the plurality of presence/absence detection sections 110 are provided) may be attached to the presence or absence flag. This identification information makes it possible to manage the presence or absence of the consumer in each zone of the structure. Further, time information indicating the time at which the presence or absence flag was transmitted may be attached to the presence or absence flag. If time information is attached to a presence or absence flag, it is necessary to synchronize the clock function of the presence/absence detection section 110 with the clock of the power demand forecast section 160.

The presence/absence information generation section 120 includes a CPU (Central Processing Unit), RAM (Random Access Memory), ROM (Read Only Memory) and other sections. The ROM stores the program to be read by the CPU. The RAM is used as a work memory of the CPU. The CPU executes the program stored in the ROM, thus performing the presence/absence information generation process. Further, the presence/absence information generation section 120 has a clock function and calendar information. This allows the presence/absence information generation section 120 to keep track of past and future dates and times. The presence/absence information generation section 120 generates presence/absence information of the consumer based on the presence or absence flag transmitted from the presence/absence detection section 110.

When the presence/absence information generation section 120 receives a presence flag first followed by an absence flag from the presence/absence detection section 110, the presence/absence information generation section 120 determines that the period of time from the reception of the presence flag to the reception of the absence flag is a presence time and compares the presence time against a given threshold. If the presence time is greater than the given threshold, the presence/absence information generation section 120 generates presence/absence information indicating that the consumer is present.

Similarly, when the presence/absence information generation section 120 receives an absence flag first followed by a presence flag, the presence/absence information generation section 120 determines that the period of time from the reception of the absence flag to the reception of the presence flag is an absence time and compares the absence time against a given threshold. Then, if the absence time is greater than the given threshold, the presence/absence information generation section 120 generates presence/absence information indicating that the consumer is absent. Presence/absence information may represent the presence or absence of the consumer by days of the month, days of the week, times, time zones and so on. This allows presence/absence information to show the tendency of the consumer in terms of presence and absence by days of the month, days of the week, times, time zones and so on.

Presence/absence information is generated as described above to ensure that presence or absence for an extremely short period at time such as several seconds or several minutes is not included in presence/absence information. This prevents the process from becoming complicated more than necessary. It should be noted, however, that presence/absence information may indicate all the presences and absences rather than comparing against the threshold as described above. Presence/absence information generated by the presence/absence information generation section 120 is supplied to the forecast database 150. It should be noted, however, that the presence and absence detection results from the presence/absence detection section 110 may be stored in the forecast database 150 in an 'as-is' manner so as to forecast power demand based on the presence and absence detection results.

The power measurement section 130 is provided in the house of a consumer to measure power consumption of that house. The power measurement section 130 has functions to serve, for example, as an ammeter and voltmeter, thus measuring the power of the house at which it is installed. The power measurement section 130 measures the power consumption of the house at all times, supplying the measured power consumption to the forecast database 150.

The environmental information input section 140 receives environmental information and inputs this information to the power demand forecast device 100. Among examples of environmental information are weather types such as fine, cloudy, rainy and snowy weathers and meteorological information such as temperature, humidity, rainfall amount, wind and sunshine duration. The environmental information input section 140 may obtain, as environmental information, meteorological information supplied, for example, from Japan Meteorological. Agency via a network such as the Internet. Alternatively, the environmental information input section 140 may be connected to a variety of measuring instruments such as thermometer, hygrometer, rain gauge and anemometer so as to obtain meteorological information from these instruments. Still alternatively, the environmental information input section 140 may obtain environmental information from meteorological information databases made available by private corporations. Environmental information is supplied to the forecast database 150.

The forecast database 150 includes not only a large-capacity storage media and its control section but also the normal time demand database 151, absence time demand database 152 and presence/absence database 153, The normal time demand database 151 stores presence/absence information indicating the status of presence of the consumer, power consumption and environmental information in the past in a manner correlated with each other. More specifically, the normal time demand database 151 stores the past presence times (periods of time from the transmission of a presence flag to the transmission of an absence flag from the presence/absence detection section 110) and the power consumptions and environmental information during the presence times in a manner correlated with each other. As a result, it is possible to keep track of the power consumption and environmental condition such as weather during each of the past presence times by referring to the normal time demand database 151.

The absence time demand database 152 stores presence/absence information indicating the status of absence of the consumer, power consumption and environmental information in the past in a manner correlated with each other. More specifically, the absence time demand database 152 stores the past absence times (periods of time from the transmission of an absence flag to the transmission of a presence flag from the presence/absence detection section 110) and the power consumptions and environmental information during the absence times in a manner correlated with each other. As a result, it is possible to keep track of the power consumption and environmental condition such as weather during each of the past absence periods by referring to the absence time demand database 152.

The presence/absence database 153 stores presence/absence information supplied from the presence/absence information generation section 120, thus serving as a database showing the tendency of the consumer in terms of presence and absence. Further, if the plurality of presence/absence detection sections 110 are provided, the presence/absence database 153 may store information such as an ID indicating from which presence/absence detection section 110 the flag was transmitted, whether the status of the consumer has changed from absence to presence and whether the status of the consumer has changed from presence to absence.

The power demand forecast section 160 includes, for example, a CPU, RPM and ROM. The ROM stores the program to be read by the CPU. The RAM is used as a work memory of the CPU. The CPU executes the program stored in the ROM, thus performing the power demand forecast process.

The power demand forecast section 160 includes the demand forecast control portion 161, normal time demand forecast portion 162 and absence time demand forecast portion 163 to forecast, power demand of the consumer on the forecasted date and time. Here, the term "forecasted date and time" refers to a future date and time for which the power demand is to be forecasted by the power demand forecast device 100.

The normal time demand forecast portion 162 forecasts power demand when the consumer is present (hereinafter referred, to as the normal time power demand forecast) by referring to the normal time demand database 151. The absence time demand forecast portion 163 forecasts power demand when the consumer is absent (hereinafter referred to as the absence time power demand forecast) by referring to the absence time demand database 152.

The demand forecast control portion 161 finds the power demand forecast (hereinafter referred to as the power demand forecast result) to be eventually output to external equipment based on the normal time power demand forecast obtained by the normal time demand forecast portion 162 and the absence time power demand forecast obtained by the absence time demand forecast portion 163. The demand forecast control portion 161 selects the normal time power demand forecast obtained by the normal time demand forecast portion 162 when it is forecasted that the consumer will be present on the forecasted date and time. On the other hand, the demand forecast control portion 161 selects the absence time power demand forecast obtained by the absence time demand forecast portion 163 when it is forecasted that the consumer will be absent on the forecasted date and time.

Further, if the consumer is present at some times and absent at some other times on the forecasted date and time such as going out and coming home several times, the power demand forecast result is found by adding together the normal time power demand forecast appropriate to the period of time during which the consumer is present and the absence time power demand forecast appropriate to the period of time during which the consumer is absent.

The forecast of power demand by the power demand forecast section 160 is accomplished, for example, by learning using a known neural network process as described in Patent Document 1 or by using an existing learning algorithm, inductive learning or other learning method. The term "neural network process" refers to an information processing mechanism constructed by copying the workings of a human brain to allow pattern recognition and forecast.

By forecasting the power demand based on the above learning, it is possible to calculate the tendencies in terms of presence and absence such as a tendency to be away from home every Monday, another tendency to be away from home from noon to 5 pm every Saturday, still another tendency to be away from home on the 10th of every month and still another tendency to be at home from 7 pm to midnight every day. Then, the status of presence or absence of the consumer on the forecasted date and time is forecasted. Then, the power demand is forecasted based on the past power consumption and past environmental information such as the weather correlated with the status of presence or absence.

For example, therefore, it is possible to make the following forecasts of power demand. That is, the power demand will be 5 kw or less because the consumer has a tendency to be away from home on Tuesday and Saturday every week. The power demand will be 50 kw or more even if the consumer is away from home when the temperature is 30° C. or above from July to September. The power demand will be about 15 kw because the consumer tends to be away from home on the 20th every month. It should be noted that the more presence/absence information, power consumptions and environmental information are accumulated in the forecast database 150, the more information is available to refer to, and therefore the higher the forecast accuracy thanks to the learning.

Further, the demand forecast control portion 161 also adjusts the found power demand forecast result. The power demand forecast result is adjusted by replacing the demand forecast, biasing at the structure level and biasing at the local level. Each of these approaches will be described in detail later.

It should be noted that although not shown, the power demand forecast device 100 has a clock function and calendar information. This allows the power demand forecast device 100 to keep track of past and future dates and times.

[1-2. Configuration of the HEMS Having the Power Demand Forecast Device]

A description will be given next of the configuration of a HEMS (home energy management system) having the power demand forecast device 100 described above with reference to FIGS. 2 and 3. FIG. 2 illustrates the relationship between a management server 200, a plurality of forecast targets 2000 and a power-related business operator 3000. As illustrated in FIG. 2, the management server 200 adapted to forecast power demand has the plurality of forecast targets 2000 under its control and forecasts the power demand for each of the forecast targets 2000. The management server 200 and forecast targets 2000 are connected via a network 4000 such as the Internet. Each of the forecast target 2000 is a structure such as a house, condominium, building or commercial facility inhabited or used by a consumer. If the forecast target 2000 is a house, the consumer is the resident of the house. It should be noted that a description will be given below by taking, as an example, a case in which the forecast target 2000 is a house, and the consumer is the resident of the house.

The power-related business operator 3000 includes any of a power utility, power producer, power transmitter, power distributor and power retailer in charge of power generation, power transformation of electrical price, power transmission, power distribution and power sales and purchases in order to supply power to consumers, The power-related business operator 3000 is connected to the management server 200 via the network 4000. The power demand forecast result found by the management server 200 is transmitted to the power-related business operator 3000 is the network 4000.

Then, power trading is conducted, for example, by a power retailer included in the power-related business operator 3000 based on the power demand forecast result. The power demand forecast result found by the management server 200 is used by the power retailers in some cases, and by the power utilities in other cases. On the other hand, power is supplied from the power-related business operator 3000 to its managed targets.

FIG. 3 is a diagram illustrating the configuration of a HEMS 1000 that includes the management server 200 adapted to forecast power demand and a house 300 (an example of the forecast target 2000) whose power demand is to be forecasted, The term "HEMS" refers to a system designed to ensure efficient use of energy in ordinary households using IT (information technology) and other technologies, thus contributing to energy saving.

The management server 200 includes the presence/absence information generation section 120, environmental information input section 140, forecast database 150 and power demand forecast section 160 that make up the power demand forecast device. This configuration is the same as that described above with reference to FIG. 1. Further, a communication section 201 is connected to the management server 200.

The communication section 201 is, for example, a communication module or network interface adapted to communicate with the forecast targets 2000 based on a predetermined protocol and via a network such as the Internet or a leased line. The communication may be; accomplished in any manner such as wired communication, wireless LAN (Local Area Network), Wi-Fi (Wireless Fidelity) and 3G network.

A description will be given next of the house 300 as an example of the forecast targets 2000. The house 300 has a control section 301, the presence/absence detection section 110, an input section. 302, display section 303, communication section 304, power accumulation facility 305, power generation facility 306, power conditioner 307, distribution board 303, terminals 309, electric appliances 310, the power measurement section 130 and so on.

The control section 301 includes, for example, a CPU, PAM and ROM, The ROM stores the program to be read by the CPU. The RAM is used as a work memory of the CPU. The CPU performs various processes based on the program stored in the ROM, thus controlling not only each of the different sections of the HEMS 1000 on the side of the house 300 but also the HEMS 1000 as a whole.

The presence/absence detection section 110 is the same as that described with reference to FIG. 1 and detects the presence or absence of the consumer in the house 300, When the presence of the consumer is detected by the presence/absence detection section 110, a presence flag is transmitted to the management server 200 via the communication section 304 and network 4000 under control of the control section 301. On the other hand, if the absence of the consumer is detected by the presence/absence detection section 110, an absence flag is transmitted to the management server 200 via the communication section 304 and network 4000 under control of the control section 301.

As the presence/absence detection section 110, an input device similar to that used in existing security systems is used. This device has a button that can enable and disable the Away Warning, At-Home Warning and other modes, another button used to notify the security service company that the resident is leaving the house, a touch panel and so on. If the presence/absence detection section 110 is such an input device, an absence flag is transmitted to the management server 200 when the resident makes an entry on the input device when leaving the house. Further, a presence flag is transmitted to the management server 200 when the resident makes an entry on the input device when returning home.

In addition to such an input device, the presence/absence detection section 110 may be a system adapted to handle human detection based on images obtained from infrared sensors or network cameras. For example, this system operates as follows. That is, a plurality of sensors or cameras are provided in the house 300 so as to detect a person moving in the direction of leaving the house 300 for going out. Then, if nobody is detected in the house 300 within a predetermined period of time thereafter, an absence flag is transmitted assuming that there is no consumer in the house 300. On the other hand, if a person is detected moving in the direction of entering the house 300 for coming home at the entrance after the detection of a person moving in the direction of leaving the house 300, a presence flag is transmitted.

Alternatively, the illuminance in the house 300 may be detected with an illuminance detector. An absence flag is transmitted assuming that nobody is at home if the illuminance is lower than the threshold. On the other hand, a presence flag is transmitted assuming that somebody is at home if the illuminance is equal to or higher than the threshold. Still alternatively, the absence of the consumer may be detected by using information obtained by monitoring the running of electric, electronic and home appliances. That is, the presence/absence detection section 110 may be of any type So long as it can detect the presence or absence of the consumer. Presence and absence flags from the presence/absence detection section 110 are transmitted to the management server 200 via the communication section 304 and network 4000 under control of the control section 301.

Still alternatively, a presence/absence detection mechanism available in a so-called security system (also referred to as a crime prevention system) already installed by the consumer in the house 300 may be used. A security system commonly offers devices designed to detect the presence or absence of the consumer. Such devices include buttons to be operated by the consumer, cameras and sensors, Information in the presence or absence of the consumer (corresponds to the above absence and presence flags) detected by these devices is notified to the security server or control center of the security company. Therefore, the absence detection mechanism available in the security system may be used as the presence/absence detection section 110 so that information indicating the absence and presence transmitted to the security server or control center is received by the management server 200.

The input section 302 is input means used by the user to enter a variety of instructions into the HEMS 1000. The input section 302 includes a touch screen, buttons, switches, dials and so on that are formed integrally with the display section 303. When an entry is made into the input section 302, a control signal appropriate to the entry is generated and output to the control section 301. Then, the control section 301 performs calculations or exercises various types of control appropriate to the control signal.

The display section 303 is display means that includes, for example, an LCD (Liquid Crystal Display), PDP (Plasma Display Panel) or organic EL (Electro Luminescence) panel, The display section 303 displays the current and past power utilization statuses, the types of the electric appliances 310 that are currently running, weather and calendar under control of the control section 301.

The communication section 304 is, for example, a communication module or network interface adapted to communicate with the management server 200 based on a predetermined protocol and is a network such as the Internet or a leased line. The communication may be accomplished in any manner such as wired communication, wireless LAN (Local Area Network), Wi-Fi (Wireless Fidelity) and 3G network. Presence and absence flags from the presence/absence detection section 110 and power consumption measured by the power measurement section 130 are transmitted by the communication section 304 to the management server 200.

The power accumulation facility 305 includes a battery module adapted to store electricity, an accumulation control section adapted to control and manage the power accumulation and so on. Any type of battery such as lithium ion secondary battery, lithium ion polymer secondary battery and nickel hydrogen battery may ho used as a battery module so long as it can charge and discharge.

The power generation facility 306 generates electric power by transforming energy other than electric power into electric power. It is preferred that the power generation facility 306 should use energy such as so-called natural or renewable energy which is low in environmental load. For example, the power generation facility should preferably use energy such as solar light, solar heat, wind power, hydropower, low head hydro power, tidal power, wave power, water temperature difference, ocean current, biomass, geothermal, or sound or vibrational energy. Alternatively, the power generation facility 306 may be an exercise bike having a power generation function or a floor having a mechanism adapted to generate power as a result of people walking on it (referred to, for example, as a power generating floor). It should be noted that the power accumulation facility 305 and power generation facility 306 are not absolutely necessary in HEMS.

The power conditioner 307 is connected to the power accumulation facility 305 and power generation facility 306. Further, the power conditioner 307 is connected to the distribution board 308.

The power conditioner 307 has a bidirectional inverter to convert DC power into AC power and vice versa and outputs the resultant power to a given destination. Further, the power conditioner 307 can output generated power obtained from the power generation facility 306 to the power accumulation facility 305. This allows the power accumulation facility 305 to be charged. Still further, the power conditioner 307 can output generated power obtained from the power generation facility 306 to the distribution board 308 for consumption by the consumer. Still further, the power conditioner 307 can extract power from the power accumulation facility 305 and supply extracted power to the distribution board 308 for consumption by the consumer. Still further, the power conditioner 307 can output power from the distribution board 308 to the power accumulation facility 305.

The distribution board 308 switches from one electrical system to another. Power from the power-related business operator 3000 is supplied to the distribution board 308. The terminals 309 are connected to the distribution board 308. Then, the plurality of electric appliances 310 are connected to the terminals 309. Power from the power-related business operator 3000, that stored in the power accumulation facility 305 and that obtained from the power generation facility 306 is supplied to the electric appliances 310 via the power conditioner 307 and distribution board 308. This makes it possible for the consumer to use the electric appliances 310.

In ordinary households, the electric appliances 310 are, for example, a television receiver, audio equipment, refrigerator, microwave oven, washing machine, air-conditioning system, iron, hair dryer, electric heater, electric cooking stove, oven, electric carpet, personal computer, copying machine, facsimile and printer. In stores and commercial facilities, the electric appliances 310 are, for example, lighting equipment, air-conditioning system and transporting equipment such as elevators. It should be noted that the electric appliances 310 are not limited thereto and may be any appliances so long as they operate on electric power.

The power measurement section 130 measures the power consumption of the forecast target 2000. The power measurement section 130 has functions to serve, for example, as an ammeter and voltmeter, the measuring the power of the house 300 at which it is installed by being connected to the distribution board 308. The measured power consumption is transmitted to the management server 200 via the communication section 304 and network 4000 under control of the control section 301.

The HEMS 1000 having the power demand forecast device is configured as described above. All the processes related to power demand forecast and transmission of a power demand forecast result are handled by the management server 200. Therefore, power demand forecast is supplied to the consumer as a so-called cloud service.

A cloud service is supplied by a server existing on a network and is an Internet-based form of using computers. Necessary processes are basically all performed by the servers. Users store their data on the servers on the Internet rather than on their personal computers, smartphones or mobile phones. This allows the users to use services and view, edit and upload their data in a variety of environments such as at home, in the office at a net cafe, in school and away from home.

[1-3. Outline of Power Trading]

A description will be given next of power demand forecast performed by the HEMS 1000 having the power demand forecast function configured as described above. The description will be given below assuming that the HEM 1000 is used in so-called power trading designed to trade power to be delivered.

A description will be given first of the outline of power trading as a premise for describing power demand forecast. Power trading is classified into two types, namely, spot trading (soot market) and hour-ahead trading (hour-ahead market). In spot trading, power to be used, for example, on the following day or the day after the following Jay is traded. In hour-ahead trading, power to be used in several hours on the same day is traded.

Spot trading is conducted, for example, in the following manner. Power delivered on the following day is traded. Therefore, the trading date is the following day. One day is divided into 48 30-minute zones, and 48 commodities are traded. Power for the next day is bidden from 8 am to 9:30 am every morning, and trading is concluded at 9:30 am. It should be noted that, on Fridays, trading of power to be delivered on the following day (Saturdays), the day after the following day (Sundays) and three days later (Mondays) is conducted.

Bidding is conducted by showing the price and quantity. Trading and delivery are, for example, in units of 1000 kw. The price per 1 kwh is in units of 1/100 of yen. For example, if a deal is struck for 600 kwh at a price of 7.48 yen/kwh for the 1 to 2 pm time zone, the sales value is 600 kwh×7.48 yen/kwh=4488 yen. On the other hand, if a deal is struck for 600 kwh at a price of 7.48 yen/kwh for the 1 to 1:30 pm time zone, the sales value is 600 kwh×7.48 yen/kwh=2244 yen.

A description will be given next of hour-ahead. trading with reference to FIG. 4. Hour-ahead trading is conducted, for example, in the following manner. Power delivered on the same day is traded. The 9 am, 1 pm and 5 pm are set as closing times of the trading sessions. For the trading session that closes at 9 am, the trading time zone is 1 pm to 5 pm (first session). For the trading session that closes at 1 pm, the trading time zone is 5 pm to 9 pm (second session). For the trading session that closes at 5 pm, the trading time zone is 9 pm to 1 pm next day (third session). That is, power to be used for four hours from four hours after the closing of trading is traded. For the trading session that closes at 9 am, therefore, power to be used from 1 pm to 5 pm, that is, from four hours after the closing to four hours later is traded. Therefore, this scheme is referred to as four-hour ahead trading (four-hour ahead market). It should be noted that trading conducted in units of 30 minutes as in spot trading.

It should be noted, however, that the trading scheme described above is merely an example of power trading, and power trading is not limited to this scheme. The closing times of trading are not limited to 9 am, 1 pm and 5 pm. Further, trading may be conducted in units of one hour rather than 30 minutes. Any scheme may be used so long as power to be used in the future is traded in advance. Still further, power may be not only purchased but also sold.

Further, forward trading is also available in power trading. In forward trading, electricity to be delivered for the next one year is traded in units of one month. Forward trading is divided into two types, 24-hour trading and daytime trading depending on the supply and demand pattern for a month. Trading and delivery are in units of 1000 kw. The price per 1 kwh is in units of 1/100 of yen. The present technology may be applied to forward trading.

[1-4. Power Demand Forecast Process]

A description will be given next of the power demand forecast process performed by the HEMS 1000 having the power demand forecast device 100. FIG. 5 is a flowchart illustrating the flow of the power demand forecast process. It should be noted that the power demand forecast process will be described assuming that the trading date is the forecasted date, and that spot trading described above is conducted by forecasting the power demand for 24 hours of the forecasted date on the previous day thereof.

First, in step S1, the power demand forecast section 160 forecasts the power demand on the forecasted date. For example, bidding is conducted from 8 am to 9:30 am every morning based on spot trading described above. If a deal is struck at 9:30 am, the power demand is forecasted in time for the bidding.

First, in step S1, the power demand forecast section 160 forecasts the power demand on the forecasted date, for example, by one of the learning methods described above. Next, in step 32, the power demand forecast result found by the power demand forecast section 160 is transmitted to the power-related business operator 3000 via the communication section 304 under control of the demand forecast control portion 161. As described above, the power-related business operator 3000 includes any of a power utility, power producer, power transmitter, power distributor and power retailer. For example, the power demand forecast is transmitted to a power retailer included among the power-related business operator 3000. Then, spot trading of power is conducted by the power retailer based on the power demand forecast. Power is supplied from the power-related business operator 3000 to the consumer on the forecasted date based on the trading result. Power is necessary every day. Therefore, this process is performed every day.

A description will be given next of the power demand forecast process performed in the case where the trading date is the forecasted date, spot trading is conducted by forecasting the power demand for 24 hours of the forecasted date on the previous day thereof, and hour-ahead trading of power to be used for four hours is conducted. It should be noted that steps S1 and S2 are the same as those described with reference to FIG. 5. Therefore, the description thereof is omitted.

In step S3, it is determined whether the current date and time have reached the forecasted date. As described above, the power demand forecast device 100 has a clock function and calendar data. This allows the power demand forecast device 100 to make the determination in step S3 by referring to the calendar date and time kept track of by the clock function.

If the current date and time have yet to reach the forecasted date in step S3, the determination in step S3 is repeated until the current date and time reach the forecasted date (No in step S3). It should be noted that if it is determined in step S3 that the current date and time have yet to reach the forecasted date, the process may return to step S1 to continue to forecast the power demand on the forecasted date followed by transmission of the power demand forecast result to the power-related business operator 3000 in step S2.

When it is determined in step S3 that the current date and time have reached the forecasted date, the process proceeds to step S4 (Yes in step S3). Next, it is determined in step S4 whether a presence or absence flag, which is different from the past tendency in terms of presence or absence, has been received from the presence/absence detection section 110. It should be noted that presence and absence flags may be transmitted from the presence/absence detection section 110 to the power demand forecast section 160. Alternatively, presence and absence flags may be transmitted to the power demand forecast section 160 via the presence/absence information generation section 120.

That is, if a presence flag is received prior to the closing time on the forecasted date despite the fact that the power demand was forecasted in step S1 assuming that the consumer would be absent during the hour-ahead trading time zone (e.g., 1 pm to 5 pm for the first session) on the forecasted date, this means that an opposite flag was received from the presence/absence detection section 110.

On the other hand, if an absence flag is received on the forecasted date after having forecasted the power demand in step S1 assuming that the consumer would be absent during the hour-ahead trading time zone (e.g., 1 pm to 5 pm for the first session) on the forecasted date, this does not mean that an opposite flag was received from the presence/absence detection section 110.

Conversely, if an absence flag is received on the forecasted date despite the fact that power demand was forecasted in step S1 assuming that the consumer would be present during the hour-ahead trading time zone (e.g., 1 pm to 5 pm for the first session) on the forecasted date, this means that an opposite flag was received from the presence/absence detection section 110.

On the other hand, if a presence flag is received after having forecasted the power demand in step S1 assuming that the consumer would be present during The hour-ahead trading time zone (e.g., 1 pm to 5 pm for the first session) on the forecasted date, this does not mean that an opposite flag was received from the presence/absence detection section 110.

If an opposite flag is received from the presence/absence detection section 110, the process proceeds to step S5 (Yes in step S4). Then, in step S5, the demand forecast adjustment process is performed by the demand forecast control portion 161. The demand forecast adjustment process refers to a process adapted to adjust the demand forecast to match an opposite flag if such a flag is received. The demand forecast adjustment process will be described in detail later.

Next, in step S6, the power demand forecast result is transmitted to the power-related business operator 3000. Next, the process proceeds to step S7. It should be noted that even if it is determined in step S4 that an opposite flag has not been received, the process proceeds to step S7 (No in step S4).

It is determined in step S7 whether the current time has reached the closest of the plurality of closing times for hour-ahead trading. If the current time has vet to reach the closest closing time, the process returns to step S4 (No in step S7). Then, the processes from step S4 to step S7 are repeated. As a result, it is checked whether a flag has been received until the current time reaches the closest closing time. If an opposite flag is received, the demand forecast is adjusted to match the opposite flag.

On the other hand, when it is determined in step S7 that the current time has reached the closest closing time, the process is terminated (Yes in step S7).

Figure 7A:
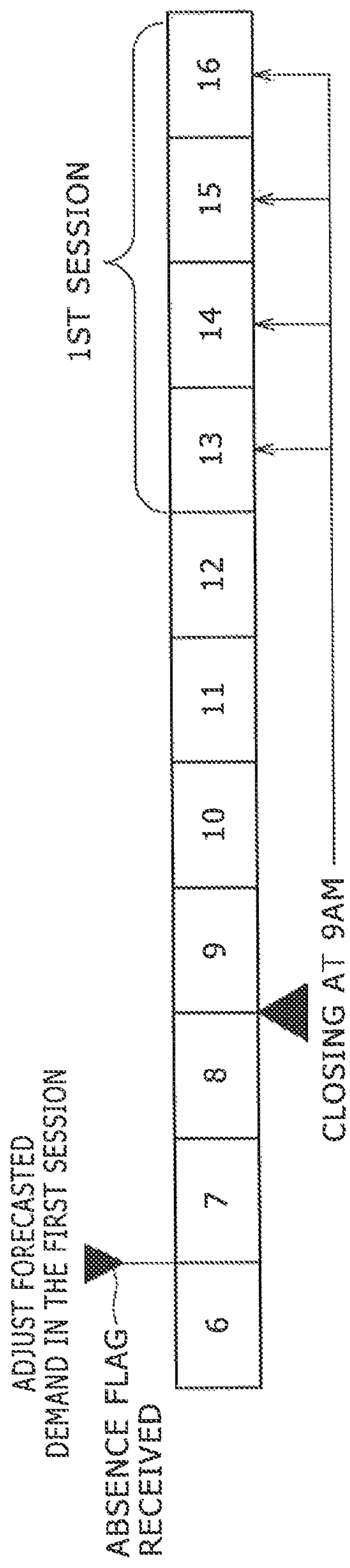
FIGS. 7A and 7B are diagrams for describing cases in which a demand forecast adjustment process is performed.
Figure 7B:
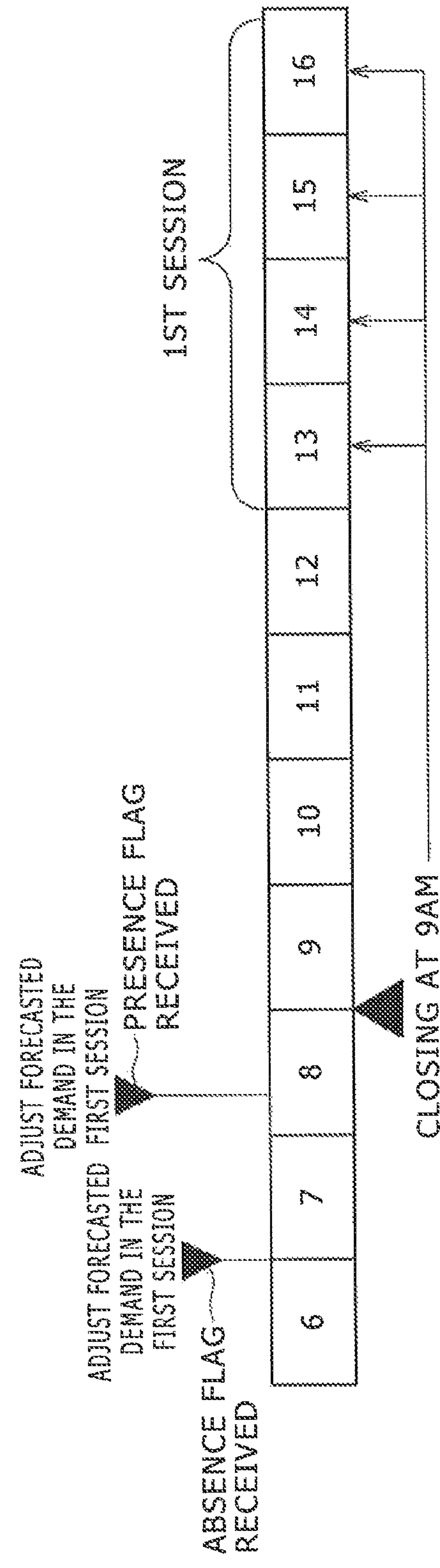

Here, a description will be given below of the processes from step S4 to step S7 with reference to FIGS. 7A and 7B by citing a specific example. FIGS. 7A and 7B illustrate the outline of hour-ahead trading as does FIG. 4. In the power demand forecast conducted on the previous day, the power demand forecast result obtained by the normal time demand forecast portion 162 is used. This forecast result assumes that the consumer will be present during the first session on the forecasted date. Then, if an absence flag indicating the absence of the consumer on the forecasted date is received as illustrated in FIG. 7A, the power demand forecast result is adjusted at the time of the first session in step S5 (Yes in step S4). The adjusted power demand forecast result is transmitted to the power-related business operator 3000 in step S6.

Then, the processes from step S4 to step S7 are repeated until the current time reaches 9 am, i.e., the closing time of the first session (No in step S7). The process is terminated when the current time reaches 9 am, i.e., the closing time of the first session (Yes in step S7).

It should be noted that it is probable that flags may be received a plurality of times before the current time reaches the closing time of hour-ahead trading. This represents a case in which the consumer goes out and returns home a plurality of times prior to the closing time on the forecasted date. As illustrated in FIG. 7B, for example, the demand forecast is adjusted to match an absence flag if such a flag is received. Then, if a presence flag is received before the closing time (9 am), the demand forecast is adjusted to match the presence flag. Then, the latest power demand forecast is transmitted to the power-related business operator 3000 at the closing time.

As described above, the demand forecast is adjusted to match the flag type until the closing time of hour-ahead trading is reached, thus tailoring the power demand forecast to the consumer's behavior and providing improved demand forecast accuracy.

It should be noted that although the first session (1 pm to 5 pm) is taken as an example of the trading time zone in FIGS. 7A and 7B, the demand can be forecasted for the second and third sessions in the same manner.

A detailed description will be given next of the power demand forecast adjustment process. This process can be achieved by using one of the three approaches, namely, "replacing the power demand forecast," "biasing the power demand forecast of a house" and "biasing the power demand forecast of a plurality of houses."

A description will be given first of the first approach to adjusting the power demand forecast, namely, "replacing the power demand forecast." It should be noted that a case will be described in which the power demand is forecasted before the forecasted date such as the previous day assuming that the consumer will be present during the first session (1 pm to 5 pm) of the forecasted date, and then an absence flag is received prior to the closing time on the forecasted date.

In this case, the power demand is forecasted before the forecasted date assuming that the consumer will be present on the forecasted date. However, an absence flag indicating the absence of the consumer on the forecasted date is received. Therefore, if the power demand forecast result is left unchanged, there will probably be a large difference between the actual power consumption on the forecasted date and the power purchased based on the power demand forecast result. The reason for this is as follows: Consumers commonly leave home with the electric appliances switched off. Further, because nobody is at home, the electric appliances are not used. As a result, the power consumption is likely to be lower than when the consumer is present.

For this reason, if an absence flag, i.e., a flag opposite to that on the forecasted date, is received on the forecasted date, the demand forecast during normal time is replaced with the demand forecast during absence time. Then, hour-ahead trading is conducted using the replaced demand forecast during absence time as a power demand forecast result. This makes it possible to procure power in a manner responding to a behavior which is different from the tendency of the consumer. Even if the consumer shows a behavior different from his or her tendency in terms of presence or absence, the power demand is forecasted properly in a manner responding to the behavior of the consumer, thus providing improved accuracy in forecasting power demand. This makes it possible to secure a proper amount of power.

It should be noted that a case was described above in which the power demand was forecasted before the forecasted date assuming that the consumer would be present on the forecasted date, and an absence flag, opposite to the above assumption, was received on the forecasted date. Conversely, however, if the power demand is forecasted before die forecasted date assuming that the consumer will be absent on the forecasted date, and a presence flag, opposite to the above assumption, is received on the forecasted date, the demand forecast during absence time found by the absence time demand forecast portion 163 is replaced with the demand forecast during normal time found by the normal time demand forecast portion 162.

A description will be given next of the second approach to adjusting the power demand forecast, namely, "biasing the power demand forecast of a house." As with the description of "replacing the power demand forecast," a case will be described in which the power demand is forecasted before the forecasted date assuming that the consumer will be present during the first session (1 pm to 5 pm) of the trading date, and then an absence flag is received prior to the closing time on the forecasted date, In "biasing the power demand forecast of a house," if an absence flag, i.e., a flag opposite to a presence flag received before the forecasted date, is received, the power demand forecast indicated by the power demand forecast result is reduced by a given amount (wattage). It should be noted that the given amount of reduction is calculated based on the forecast result for the consumer obtained by the absence time demand forecast portion 163 during a given period of time (e.g., one month) in the past.

As described above, if an absence flag is received, the power demand forecast result is matched with the flag type by reducing the demand forecast indicated by the power demand forecast result, thus making it possible to procure power in a manner responding to an unexpected behavior of the consumer. The reason for this is as follows: Consumers commonly leave home with the electric appliances 310 switched off. Further, because nobody is in the house 300, the electric appliances 310 are not used. As a result, the power consumption is likely to be lower than when the consumer is present. Even if the consumer shows a behavior different from his or her tendency in terms of presence or absence, the power demand is forecasted properly in a manner responding to the behavior of the consumer, thus providing improved accuracy in forecasting power demand. This makes it possible to secure a proper amount of power.

It should be noted that a case was described above in which the power demand was forecasted before the forecasted date assuming that the consumer would be present on the forecasted date, and an absence flag, opposite to the above assumption, was received on the forecasted date. Conversely, however, if the power demand is forecasted before the forecasted date assuming that the consumer will be absent on the forecasted date, and a presence flag, opposite to the above assumption, is received on the forecasted date, the demand forecast indicated by the power demand forecast result is increased by a given amount (wattage). The reason for this is as follows: More electric appliances 310 are commonly left running in the house 300 while they are at home than while they are away. As a result, it is likely that the power demand may be larger than when the consumer is absent. It should be noted that the given amount of increase is calculated based on the forecast result for the house 300 obtained by the normal time demand forecast portion 162 during a given period of time (e.g., one month) in the past.

A description will be given next of the third approach to adjusting the power demand forecast, namely, "biasing the power demand forecast of a plurality of houses." As described above with reference to FIG. 2, the management server 200 adapted to forecast power demand has the plurality of forecast targets 2000 under its control and forecasts the power demand for each of the forecast targets 2000.

As with the description of "replacing the power demand forecast," a case will be described in which the power demand is forecasted before the forecasted date assuming that the consumer will be present during the first session (1 pm to 5 pm) of the trading date, and then an absence flag is received prior to the closing time on the forecasted date.

In "biasing the power demand forecast of a plurality of houses," if an absence flag, i.e., a flag opposite to a presence flag received before the forecasted date, is received, the number of forecast targets (houses) with absent residents that are serviced by the service based on the present technology is counted for a time period from the reception of the absence flag to a given period of time later. This counting can be accomplished by referring to the presence/absence database 153. Then, the power demand forecast results for all the houses with absent residents are summed up, and a given amount (wattage) is reduced from the sum of the power demand forecast results. It should be noted that the given amount of reduction is calculated based on the forecast result for the consumer obtained by the absence time demand forecast portion 163 during a given period of time (e.g., one month) in the past.

As described above, the power demand forecast result is matched with the flag type as in the second approach, namely, "biasing the power demand forecast of a house," thus making it possible to procure power in a manner responding to an unexpected behavior of the consumer. The reason for this is as follows: Consumers commonly leave home with the electric appliances 310 switched off. Further, because nobody is in the house 300, the electric appliances 310 are not used. As a result, the power consumption is likely to be lower than when the consumer is present. Even if the consumer shows a behavior different from his or her tendency in terms of presence or absence, the power demand is forecasted properly in a manner responding to the behavior of the consumer, thus providing improved accuracy in forecasting power demand. This makes it possible to secure a proper amount of power.

It should be noted that a case was described above in which the power demand was forecasted assuming that the consumer would be present on the forecasted date, and an absence flap, opposite to the above assumption, was received on the forecasted date. Conversely, however, if the power demand is forecasted before the forecasted date assuming that the consumer will be absent on the forecasted date, and a presence flag, opposite to the above assumption, is received on the forecasted date, the demand forecast indicated by the power demand forecast result is increased by a given amount (wattage). The reason for this is as follows More electric appliances 310 are commonly left running in the house 300 while they are at home than while they are away. As a result, it is likely that the power demand may be larger than when the consumer is absent. It should be noted that the given amount of increase is calculated based on the forecast result for the house 300 obtained by the normal time demand forecast portion 162 during a given period of time (e.g., one month) in the past.

As described above, the first embodiment of the present technology takes into consideration not only environmental information and past power consumptions but also presence/absence information of the consumer to forecast the power demand, thus providing improved. accuracy in forecasting power demand. The reason for this is as follows: Even if the future power demand is forecasted based, for example, on environmental information such as weather and past power demands, less electric appliances 310 will be used when the consumer is not at home. As a result, it is probable that the power consumption may be lower than when the consumer is at home. As described above, presence/absence information is likely a parameter that can affect the power demand forecast to a greater degree than environmental information such as weather and past power consumptions.

Improved accuracy in forecasting power demand makes it possible to procure an actually necessary amount of power. Further, improved accuracy in forecasting power demand eliminates the probability that more than necessary amount of power will be procured, thus contributing to reduced power procurement cost and supplying power to consumers at lower prices.

It should be noted that power demand may be forecasted by adding presence/absence information as one of the parameters for learning using a neural network process, existing learning algorithm, inductive learning or other learning method. This also ensures accuracy in forecasting power demand when the consumer is absent.

<2. Second Embodiment>

[2-1. Configuration of the HEMS Having Power Failure Determination Function]

A description will be given next of a second. embodiment of the present technology. The second embodiment differs from the first embodiment in that it has a security system 601, in that a management server 500 is also connected to a security server 7000 via the network 4000, in that the management server 500 has a power failure determination section 501, and in that an appliance sensor 602 is provided in the house 300, i.e., a forecast target. FIG. 8 is a block diagram illustrating the configuration of a HEMS 5000 according to the second embodiment of the present technology.

As illustrated in FIG. 8, the security system 601 is connected to the control section 301 of the house 300, i.e., a forecast target. The security system 601 is a crime and disaster prevention system capable of detecting an intruder and fire or other anomaly in a house, building or other structure.

The security system 601 has devices and equipment such as an intrusion detection sensor provided on a door, window or other location, monitoring camera, door locking system based on biometric authentication such as fingerprint authentication, door locking system based on personal identification number entry, intercom with a video monitor and input device adapted to notify the security company that the consumer will be away. The security system 601 is capable of detecting whether the consumer is present or not with these devices and equipment. As a result, the security system 601 can serve as a presence/absence detection section. Therefore, if the presence/absence status of the consumer is detected by the security system 601, a presence or absence flag may be generated in response to he detection result so as to transmit the flag to the management server 500 via the communication section 304.

The security server 7000 handles operation and processing of security services provided by a security business operator. A security business operator is engaged in offering so-called home security, crime prevention and guarding services and uses the security system 601. The security server 7000 is connected to the house 300, i.e., a forecast target, via the network 4000 such as the Internet. Although described in detail later, absence time anomaly detection information, for example, is transmitted from the house 300 to the security server 7000 via the network 4000.

The appliance sensor 602 includes, for example, an IC (Integrated Circuit) and is provided in the distribution board 308. The appliance sensor 602 detects which electric appliances 310 are currently running and further measures the power consumptions of the electric appliances 310 that are currently running. The appliance sensor 602 obtains an electric current waveform by measuring the amperage of electric current flowing through the distribution board 308. The waveforms of electric current supplied to the electric appliances 310 differ one from another depending on the appliance type, manufacturer and so on. For example, therefore, the appliance sensor 602 stores the waveform of each appliance in a proper working condition in advance. This makes it possible to determine the type of each of the electric appliances 310 that are connected to the distribution board 308 and currently running by comparing the electric current waveform at the time of power supply against the stored waveform. Further, the appliance sensor 602 measures the power consumption of the electric appliances 310.

As described above, it is possible to keep track of which electric appliances 310 are connected to the distribution board 308, which electric appliances 310 are currently running and which electric appliances 310 are consuming how much power. Running appliance information indicating the electric appliances 310 that are connected to the distribution board 308 and running, and running appliance power consumption indicating the power consumption of the electric appliances that are running, are transmitted to the control section 301 by wireless communication means such as ZigBee and further transmitted to the management server 500 via the communication section 304.

Alternatively, detection of the types of the electric appliances 310, detection of which thereof are running and measurement of their power consumption, may be accomplished by any other manner rather than using the appliance sensor 602 provided in the distribution board 308 so long as such detection and measurement are possible. For example, so-called smart taps may be used.

A smart tap refers to a power consumption measuring instrument that incorporates a power sensor and communication module. This tap is plugged into an outlet and is connected to the electric appliance 310 whose power consumption is to be found. The power utilization status of each of the electric appliances 310 is measured and analyzed by the smart tap in realtime, and measurement and analysis data is transmitted by the communication module of the smart tap or the communication section 304 to the management server 500. The electric current waveforms of the electric appliances 310 during use, for example, differ one from another depending on the appliance type. Therefore, measurement and analysis data obtained from the smart taps makes it possible to identify what kinds of the electric appliances 310 are connected and which electric appliances 310 are used.

As described above, it is possible to identify which electric appliances 310 are connected to the distribution board 308 and obtain the power consumption of each of the electric appliances 310. Therefore, the absence time demand database 152 can store data indicating the power consumption of each of the electric appliances 310 in correlation with presence/absence information. This makes it possible to keep track of how much power each of the electric appliances 310 consumed when the consumer was present and absent.

The power failure determination section 501 is provided in the management server 500. The power failure determination section 501 includes, for example, a CPU, RAM and ROM and determines whether a power failure is taking place by executing the program stored in the ROM.

The power failure determination section 501 detects a power failure based on the power demand forecast of each of the electric appliances 310 on the current date and time found by the power demand forecast, section 160 and the power consumption of each of the electric appliances 310 measured by the appliance sensor 602, power measurement section 130 or other section. For example, the power failure determination section 501 compares the power demand forecast of each of the electric appliances 310 at the current date and time against the power consumption thereof at present and determines that the electric appliance 310 is developing a power failure if the difference between the power demand forecast and power consumption is equal to or greater than a given threshold.

It should be noted, however, that a case in which the electric appliance 310 is developing a power failure is not limited to that described above. For example, it may be determined that a power failure is taking place if the difference between the power demand forecast and power consumption is greater than 0 (i.e., if there is a difference therebetween).

Alternatively, it may be determined that the electric appliance 310 is developing a power failure if, as a result of comparison between the power consumption and a given threshold different from the above, the power consumption exceeds the given threshold.

The power failure determination section 501 generates two pieces of information if it determines that a power failure is taking place, namely, information indicating that a power failure is taking place and information as to which electric appliance is causing the power failure because of the running of this appliance. These pieces of information are transmitted to the security server 7000 via the communication section 201 and network 4000. This allows the security company to know specifically which electric appliance 310 is causing the power failure.

It has been common for a security company to respond to an accident such as "fire" in the house 300 after detecting the accident. However, the second embodiment of the present technology allows the security company to know that the electric appliance 310 is developing a power failure due to malfunction which could otherwise lead to a fire rather than learning the occurrence of the fire and responding to it immediately after it has occurred, thus preventing fires in a proactive manner.

Among examples of the electric appliance 310 that could cause a fire are an iron, hair dryer, electric heater, electric cooking stove, oven and electric carpet.

Further, if it is determined by the power failure determination section 501 that a power failure is taking place, a notice to that effect may be transmitted to the terminal device of the consumer via the communication section 304. Among devices that can be used as a terminal device are a laptop personal computer, smartphone and mobile phone owned by the consumer. It is likely that these terminal devices may be carried by or located near the consumer. Therefore, it is possible to speedily inform the consumer of a power failure by notifying these devices. Among possible methods to notify a terminal device are notification by email, notification by telephone and notification by using the messaging function of a variety of SNSs (Social Networking Services). Still further, the consumer may possess a small device used exclusively for notification that can sound an alarm or vibrate when notified.

Other components of the HEMS 5000 are the same as those of the counterpart according to the first embodiment. Therefore, the description thereof is omitted. The HEMS 5000 according to the second embodiment is configured as described above. The power failure detection system as defined in the appended claims includes the security system 601 serving as a presence/absence detection section, the power failure determination section 501 and communication section 201.

[2-2. Power Failure Determination Process]

A description will be given next of the power failure determination process in the second embodiment. It should be noted that the power demand of the house 300, i.e., a forecast target, is forecasted as in the first embodiment. Further, in the second embodiment, whether there is any power failure during absence of the consumer is determined, and the determination result is notified to the security server 7000.

Figure 9:
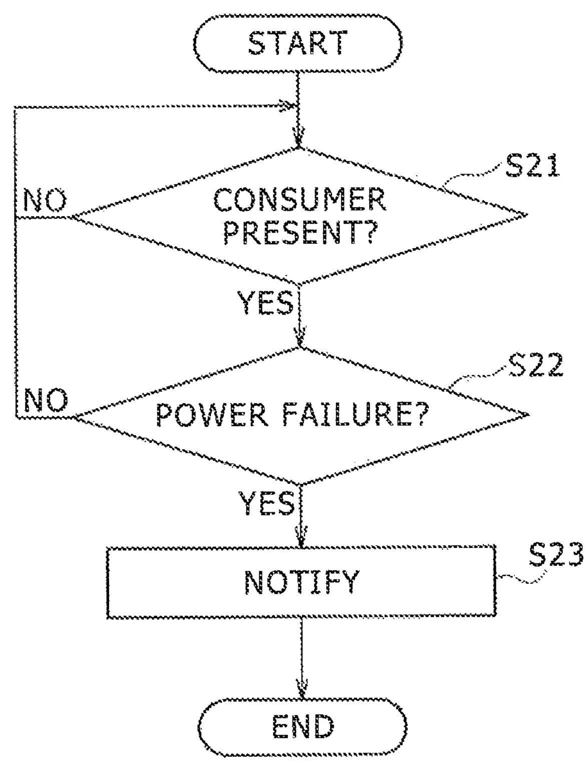
FIG. 9 is a flowchart illustrating the flow of a power failure determination process.

FIG. 9 is a flowchart illustrating the flow of the power failure determination process in the second embodiment. This process is handled by the management server 500. First, in step S21, it is determined whether the consumer is absent or not. The determination as to whether the consumer is absent or not can be made by checking whether the flag transmitted from the house 300, i.e., a forecast target, is an absence flag or not. If the consumer is not absent, that is, if the consumer is present (at home), the determination process in step S21 is repeated until it is determined that the consumer is absent (No in step S21). The process proceeds to step S22 when it is determined that the consumer is absent (Yes in Step S21).

Next, it is determined in step S22 whether a power failure is taking place. If no power failure is taking place, the process returns to step S21 (No in step S22), and it is repeatedly determined whether the consumer is absent and whether a power failure is taking place. On the other hand, when it is determined that a power failure is taking place, the process proceeds to step S23 (Yes in Step S22). Then, a notice to the effect that a power failure has been detected is transmitted in step S23 to the security server 7000, a terminal device 8000 and so on via the communication section 304.

As described above, if presence/absence information and power demand forecast result are used in power trading, and if the power failure determination process is further used, this will benefit not only the business operator operating the HEMS 5000 and the power retailer or other business operator engaged in power trading through power demand forecast but also the security company.

It should be noted that it was described above that a power failure taking place during absence of the consumer was detected and notified to the consumer. However, detection of a power failure and notification thereof are not necessarily performed when the consumer is absent. Instead, detection of a power failure and notification thereof may be performed when the consumer is present. The reason for this is as follows Even if the consumer is present, the electric appliance 310 may be erroneously switched on, and the consumer may not notice the fact that the electric appliance 310 has been switched on.

<3. Modification Example>

While a specific description has been given of the preferred embodiments of the present technology, the present technology is not limited to these embodiments and may be modified in various ways based on the technical concept of the present technology.

It was described above that the management server 500 had the power demand forecast section 160 so that the management server 500 could forecast power demand. Alternatively, however, the forecast target such as the house 300 may have the power demand forecast section 160 to forecast its own power demand so that he power demand forecast is transmitted to the management server 500 and power-related business operator 3000. Still alternatively, a power utility, power retailer or other business operator included in the power-related business operator 3000 may have the power demand forecast device 100 to forecast the power demand.

The present technology may have the following configurations.

(1)

A power demand forecast device including:

an absence detection section adapted to detect whether a consumer is absent at a given location; and a power demand forecast section adapted to forecast a power demand on a forecasted date and time in future based on an absence detection result obtained by the absence detection section.

(2)

The power demand forecast device of feature 1 further including a power measurement section adapted to measure a power consumption of the given location, in which the power demand forecast section further forecasts the power demand based on the power consumption.

(3)

The power demand forecast device of feature 1 or 2 further including:

an environmental information input section adapted to obtain environmental information, in which the power demand forecast section further forecasts the power demand based on the environmental information.

(4)

The power demand forecast device of any one of features 1 to 3 further including:

a database adapted to store the absence detection result, in which the power demand forecast section forecasts the power demand by referring to the database, (5)

The power demand forecast device of feature 4, in which the database further stores de power consumption in correlation with the absence detection result.

(6)

The power demand forecast device of feature 4 or 5, in which the database still further stores the environmental information in correlation with the absence detection result.

(7)

The power demand forecast device of any one of features 1 to 6, in which the absence detection section is a security system capable of detecting the presence of the consumer at the given location.

(8)

The power demand forecast device of any one of features 1 to 7, in which the power demand forecast section further adjusts a power demand forecast based on absence detection result obtained by the absence detection section.

(9)

The power demand forecast device of feature 8, in which the power demand forecast section adjusts the power demand forecast if the day on which the power demand is forecasted is the same as the day for which the power demand is forecasted.

(10)

The power demand forecast device of feature 8 or 9, in which:

the power demand forecast section includes a presence time demand forecast portion adapted to forecast a power demand when the consumer is present, and an absence time demand forecast portion adapted to forecast a power demand when the consumer is absent; and the power demand forecast is adjusted by replacing a forecast result obtained from the presence time demand forecast portion with that obtained from the absence time demand forecast portion or vice versa based on the absence detection result.

(11)

The power demand forecast device of any one of features 8 to 10, in which the power demand forecast section adjusts the power demand forecast by increasing or reducing the demand forecast result based on the absence detection result.

(12)

The power demand forecast device of any one of Features 8 to 11, in which if the power demand forecast section has forecasted, on the previous day of the forecasted date and time or earlier, a power demand assuming that the consumer will be absent on the forecasted date and time based on the absence detection result and the absence detection result is obtained by the absence detection section on the forecasted date and time to the effect that the consumer is not absent, the Dower demand forecast section increases the power demand forecast found on the previous day of the forecasted date and time or earlier.

(13)

The power demand forecast device of any one of features 8 to 12, in which if the power demand forecast section has forecasted, on the previous day of the forecasted date and time or earlier, a power demand assuming that the consumer will not be absent on the forecasted date and time based on the absence detection result and the absence detection result is obtained by the absence detection section on the forecasted date and time to the effect that the consumer is absent, the power demand forecast section reduces the power demand forecast found on the previous day of the forecasted date and time or earlier.

(14)

The power demand forecast device of any one of features 1 to 13 further including:

an absence information generation section adapted to generate absence information indicating a tendency of the consumer about absence represented by days of the month, days of the week, time zones and so on, in which the power demand forecast section forecasts the power demand based on the absence information.

(15)

A power demand forecast method including:

detecting whether a consumer is absent at a given location; and forecasting a power demand based on an absence detection result.

(16)

A power demand forecast system including:

an absence detection section adapted to detect whether a consumer is absent at a given location;

a power demand forecast server having a power demand forecast section adapted to forecast a power demand based on an absence detection result obtained by the absence detection section; and a communication section adapted to transmit the absence detection result obtained by the absence detection section to the power demand forecast server.

(17)

A power failure detection system including:

an absence detection section adapted to detect whether a consumer is absent at a given location;

a power failure determination section adapted to determine whether a power failure is taking place if the absence of the consumer is detected by the absence detection section; and a communication section adapted to notify the occurrence of a power failure to external equipment if the power failure determination section determines that a power failure is taking place.

The present disclosure contains subject matter related to that disclosed in Japanese Priority Patent Application JP 2011-233272 filed in the Japan Patent Office on Oct. 24, 2011, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A power demand forecast device comprising:

an absence detection section adapted to detect whether a consumer is absent at a given location;

a power demand forecast section adapted to forecast a power demand on a forecasted date and time in future based on an absence detection result obtained by the absence detection section;

a presence/absence information generation section adapted to generate presence/absence information, wherein if a presence time is greater than a given time threshold, the presence/absence information generation section generates presence/absence information indicating that the consumer is present; and a power failure determination section adapted to compare a power demand forecast of at least one electric appliance at the current date and time against the present power consumption of the electric appliance and determine whether the electric appliance is developing a power failure based on the difference between the power demand forecast and power consumption and a given threshold.

2. The power demand forecast device of claim 1 further comprising:

a power measurement section adapted to measure a power consumption of the given location, wherein the power demand forecast section further forecasts the power demand based on the power consumption.

3. The power demand forecast device of claim 1 for comprising:

an environmental information input section adapted to obtain environmental information, wherein the power demand forecast section further forecasts the power demand based on the environmental information.

4. The power demand forecast device of claim 1 further comprising:

a database adapted to store the absence detection result, wherein the power demand forecast section forecasts the power demand by referring to the database.

5. The power demand forecast device of claim 4, wherein the database further stores the power consumption in correlation with the absence detection result.

6. The power demand forecast device of claim 4, wherein the database still further stores the environmental information in correlation with the absence detection result.

7. The power demand forecast device of claim 1, wherein the absence detection section is a security system capable of detecting the presence of the consumer at the given location.

8. The power demand forecast device of claim 1, wherein the power demand forecast section further adjusts a power demand forecast based on the absence detection result obtained by the absence detection section.

9. The power demand forecast device of claim 8, wherein the power demand forecast section adjusts the power demand forecast if the day on which the power demand is forecasted is the same as the day for which the power demand is forecasted.

10. The power demand forecast device of claim 8, wherein the power demand forecast section includes a presence time demand forecast portion adapted to forecast a power demand when the consumer is present, and an absence time demand forecast portion adapted to forecast a power demand when the consumer is absent; and the power demand forecast is adjusted by replacing a forecast result obtained from the presence time demand forecast portion with that obtained from the absence time demand forecast portion or vice versa based on the absence detection result.

11. The power demand forecast device of claim 8, wherein the power demand forecast section adjusts the power demand forecast by increasing or reducing the demand forecast result based on the absence detection result.

12. The power demand forecast device of claim 11, wherein if the power demand forecast section has forecasted, on the previous day of the forecasted date and time or earlier, a power demand assuming that the consumer will be absent on the forecasted date and time based on the absence detection result and the absence detection result is obtained by the absence detection section on the forecasted date and time to the effect that the consumer is not absent, the power demand forecast section increases the power demand forecast found on the previous day of the forecasted date and time or earlier.

13. The power demand forecast device of claim 11, wherein if the power demand forecast section forecasts, on the previous day of the forecasted date and time or earlier, a power demand assuming that the consumer will not be absent on the forecasted date and time based on the absence detection result and the absence detection result is obtained by the absence detection section on the forecasted date and time to the effect that the consumer is absent, the power demand forecast section reduces the power demand forecast found on the previous day of the forecasted date and time or earlier.

14. The power demand forecast device of claim 1 further comprising:

an absence information generation section adapted to generate absence information indicating a tendency of the consumer about absence represented by days of the month, days of the week, time zones and so on based on the absence detection result, wherein the power demand forecast section forecasts the power demand based on the absence information.

15. A power demand forecast method comprising:

detecting whether a consumer is absent at a given location;

forecasting a power demand based on an absence detection result;

generating presence/absence information, wherein if a presence time is greater than a given time threshold, the presence/absence information generated indicates that the consumer is present; and comparing a power demand forecast of at least one electric appliance at the current date and time against the present power consumption of the electric appliance and determining whether the electric appliance is developing a power failure based on the difference between the power demand forecast and power consumption and a given threshold.

16. A power demand forecast system comprising:

an absence detection section adapted to detect whether a consumer is absent at a given location;

a power demand forecast server having a power demand forecast section adapted to forecast a power demand based on an absence detection result obtained by the absence detection section;

a communication section adapted to transmit the absence detection result obtained by the absence detection section to the power demand forecast server;

a presence/absence information generation section adapted to generate presence/absence information, wherein if a presence time is greater than a given time threshold, the presence/absence information generation section generates presence/absence information indicating that the consumer is present; and a power failure determination section adapted to compare a power demand forecast of at least one electric appliance at the current date and time against the present power consumption of the electric appliance and determine whether the electric appliance is developing a power failure based on the difference between the power demand forecast and power consumption and a given threshold.

17. A power failure detection system comprising:

an absence detection section adapted to detect whether a consumer is absent at a given location;

a communication section adapted to notify the occurrence of a power failure to external equipment if the power failure determination section determines that a power failure is taking place;

a presence/absence information generation section adapted to generate presence/absence information, wherein if a presence time is greater than a given time threshold, the presence/absence information generation section generates presence/absence information indicating that the consumer is present; and a power failure determination section adapted to compare a power demand forecast of at least one electric appliance at the current date and time against the present power consumption of the electric appliance and determine whether the electric appliance is developing a power failure based on the difference between the power demand forecast and power consumption and a given threshold.

* * * * *